Dec. 28, 1937. W. P. KELLETT 2,103,751
MEANS FOR LOCKING GOODS CONTAINERS ON TRANSPORTATION VEHICLES
Filed Feb. 28, 1935 3 Sheets-Sheet 2
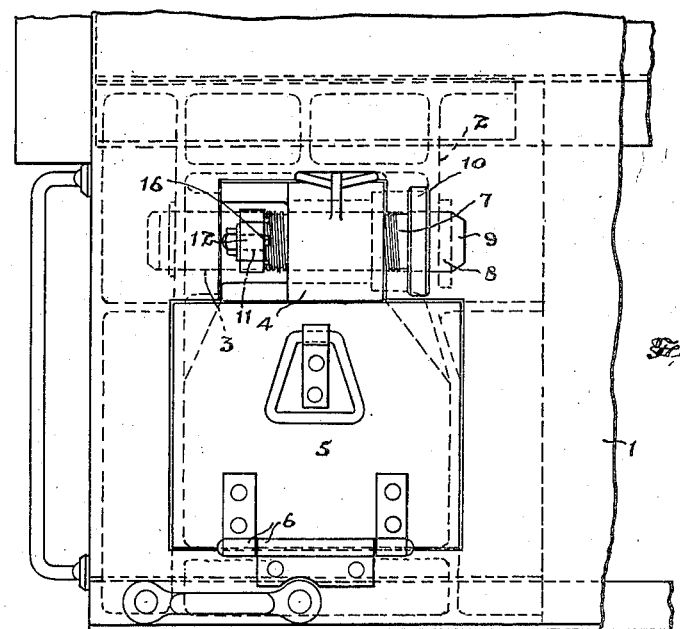
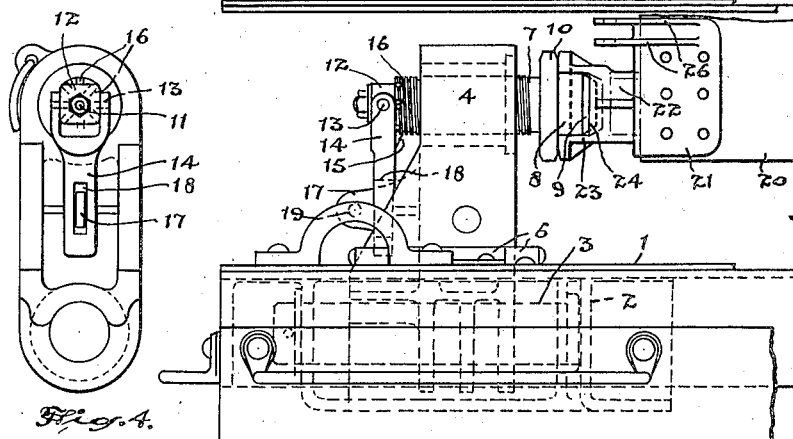
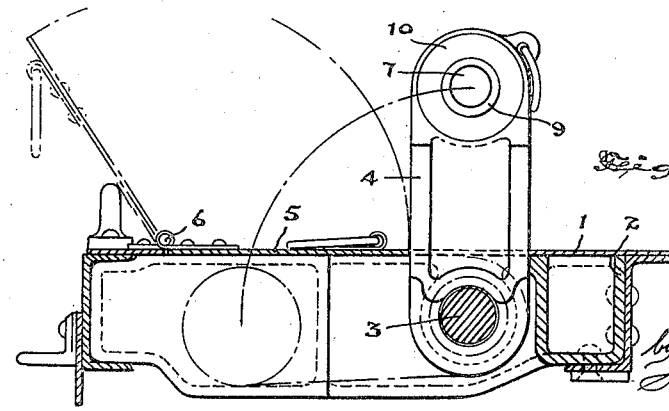
Inventor.
William P. Kellett Dec. 28, 1937.  W. P. KELLETT  2,103,751
MEANS FOR LOCKING GOODS CONTAINERS ON TRANSPORTATION VEHICLES
Filed Feb. 28, 1935  3 Sheets-Sheet 3
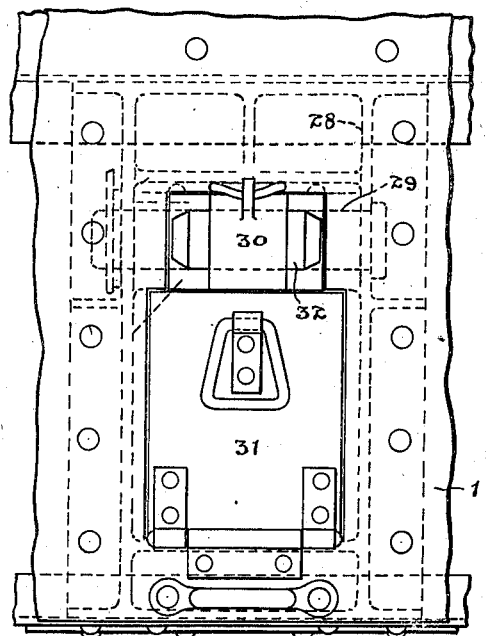
Fig. 6.
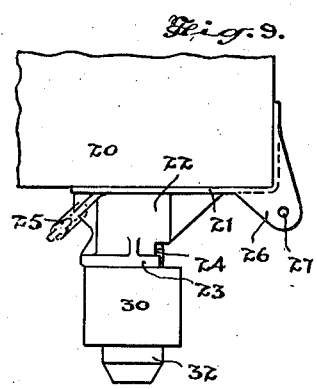
Fig. 9.
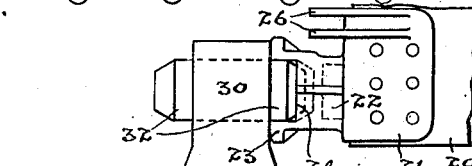
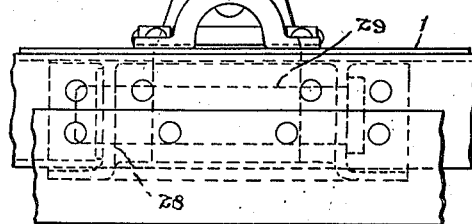
Fig. 8.
Fig. 7.
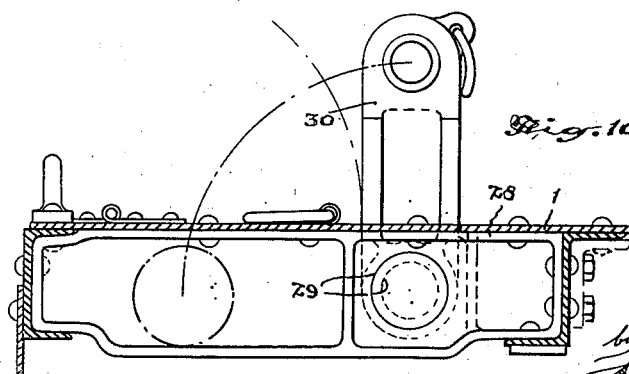
Fig. 10.
Inventor.
William P. Kellett.

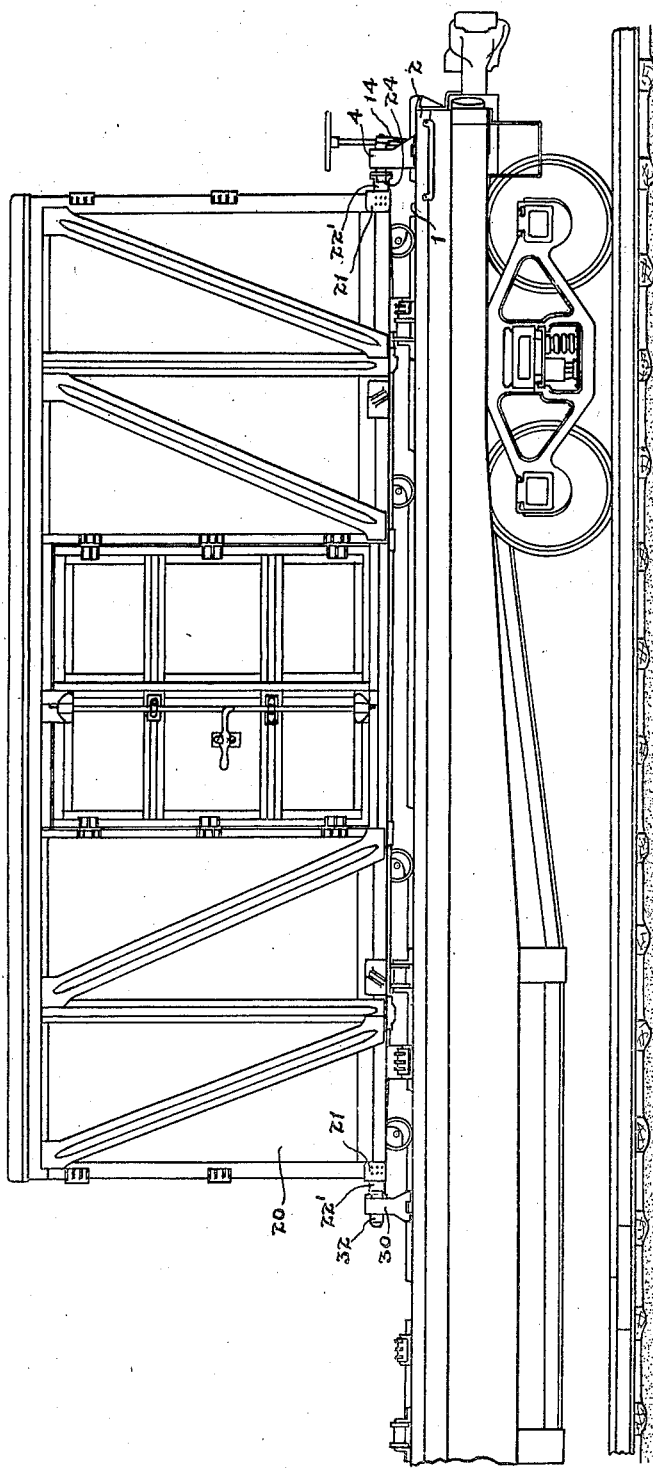

Patented Dec. 28, 1937

2,103,751

UNITED STATES PATENT OFFICE 2,103,751

MEANS FOR LOCKING GOODS CONTAINERS ON TRANSPORTATION VEHICLES

William P. Kellett, New York, N. Y.

Application February 28, 1935, Serial No. 8,685

8 Claims. (Cl. 105—366)

The objects of this invention are to provide a simple and effective means for securely holding removable freight and goods containers upon the decks of transportation vehicles, which will permit the easy and rapid release of the containers and which may be readily moved out of the path of movement of the containers in their movement to and from their transporting position on the vehicles.

The principal features of the invention consist in the novel construction and arrangement of "jack" members pivotally mounted to swing below and to extend above the deck of the transport vehicle, and in the provision of socket members on the containers adapted to engage in locking engagement with the "jack" members when in their raised position to hold the containers from sidewise and endwise movement.

In the accompanying drawings Figure 1 is a side elevational view of a portion of a railway car showing a freight or goods container mounted thereon and secured by the improved locking means as defined herein.

Figure 2 is an enlarged plan view of a corner of the car deck showing the container holding "jack" in the "raised" or "locking" position.

Figure 3 is a side elevational view of the structure illustrated in Figure 2 and showing the socket member on the end of a container engaging the "jack".

Figure 4 is a front elevational view of the "jack" shown in Figure 3.

Figure 5 is a part sectional elevational view of the car structure illustrating the "jack" in elevation from the "container" engaging side.

Figure 6 is a plan view of a portion of the car deck showing a modified form of "jack" as used in a central portion of the car to engage the "inward" end of a container.

Figure 7 is a side elevation of the structure shown in Figure 6 and showing the engaging socket member of the container engaging the "jack".

Figure 8 is a front elevational view of the "socket" bracket on the container for engaging the "jack".

Figure 9 is a plan view of the bracket shown in Figure 8.

Figure 10 is a part sectional elevational view of the car structure illustrated in Figure 6 showing the "jack" in elevation.

In the development of a "through" transport system for handling freight from warehouse to warehouse, I have devised containers equipped with "castor" wheel mountings which enable the container to be rolled about and on and off trucks and railway cars both endwise and sideways, and it is the purpose of this invention to provide means for securely locking the containers in place on the deck of the car or truck so that they will be held from longitudinal or lateral displacement when being transported.

The structure herein shown is that applied to a railway flat car equipped to receive the castor mounted containers. The corner of the frame of the car deck 1 is provided with a cast or suitably fabricated frame structure 2 at the inward end of which is mounted a horizontal shaft 3 arranged with its axis extending longitudinally of the car. Mounted on the shaft 3 midway of its length is a "jack" member 4 which is adapted to lie horizontally below the level of the deck or to be swung to the vertical position illustrated in the drawings.

A plate 5 mounted on a hinge structure 6 is adapted to close over the "jack" when it is in the horizontal position and to abut the side of the "jack" when said "jack" is in the raised position, so that there will be no opening in the car deck which will be dangerous to the operatives working on the car.

The upper end of the "jack" is provided with a horizontal threaded orifice in which is threaded the jack screw 7. This screw is formed with a cylindrical end 8 tapered at its extremity 9 and provided with a circular flange 10. The opposite end is formed with a reduced portion 11 upon which is rotatably mounted a block 12, and said block is provided with diametrically opposite pins 13 on which is pivotally mounted a forked lever 14. The lever is provided with a lug projection 15 which is adapted to fit into radially arranged notches 16 in the adjacent end of the threaded portion of the jack screw.

The lever is so arranged that it may be swung outwardly from its vertical position to disengage the lug 15 from one of the notches in the screw. It may then be rotated to bring the lug into engagement with another notch to effect the rotation of the jack screw. This operation may be repeated as often as desired, and when the jack screw is in the desired position, the lever may be returned to the original position.

A lug 17 on the "jack" projects through a slot 18 in the lever and the lug is provided with a hole 19 into which a suitable lock may be placed to lock the jack screw.

The container 20, has secured on each lower corner an angle bracket 21 which is provided with a projecting portion 22 in the outer face of which is formed a tapered circular socket 22′ which is adapted to receive the tapered end 8 of the jack screw 7. A flaring flange 23 extends outwardly from the socket 22′ leaving an opening 24 which is turned toward the outward side of the container. This flaring flange forms a guide to direct the end of the jack screw into the socket 22′ and the opening 24 permits the jack and screw being swung outwardly or inwardly when the screw has been withdrawn a sufficient distance to clear the socket.

The bracket 21 is provided with a chain hook 25 arranged at an acute angle to the axis of the socket 22′ and a pair of flanges 26 with vertical holes 27 are arranged at the outer corner.

In a more or less central position on the car at points at either side which will be adjacent to the inward end of the container 20, there is arranged a metal frame 28 similar to the frame 2 at the front corner in which is mounted a horizontal shaft 29 and on this shaft is mounted a "jack" 30 which will swing downwardly to a horizontal position beneath a hinged cover 31 or which will stand in a vertical position. The upper end of the "jack" is provided with a horizontal stud 32 with tapered ends to engage the sockets 22′ of containers moved thereagainst. The stud ends in this "centre" jack are not adjustable as the containers are rolled in against same, and any adjustment necessary is taken up by the screw jacks at the ends of the car.

The jack structures described are, it will be understood, arranged at each side of the car so that they engage the "socket" members on the containers and the deep flanges 23 form ample protection against the containers being displaced from the car deck under extraordinary stress even if the "jack screws" are not properly tightened into place in the sockets, as the flanges are arranged on the inward sides of a pair of jacks at each end of the container.

The devices herein described are simple but very efficient and rugged and will effectively withstand any shocks to which the car may be subjected.

The invention is herein shown applied to a railway car, but it may be equally well applied to any type of transport vehicle.

What I claim as my invention is:—

1. In a transportation vehicle having a goods container movably mounted thereon, the combination with jacks pivotally mounted on said vehicle to be lowered out of the path of movement of the container or raised to an obstructing position, of socket members carried by said containers having tapered sockets, a jack screw mounted on each of said jacks and having a tapered end to enter in locking engagement with the socket members on said containers irrespective of slight variations encountered in the heights and disposition of the sockets of different containers, and contact means engageable after entry of the tapered ends of the jack screws into said tapered sockets a predetermined distance to prevent further entry and thereby relieve said sockets of excessive wedging thrusts.

2. In a transport vehicle having a goods container removably mounted thereon, the combination with jacks pivotally mounted on said vehicle so as to be raised and lowered, of socket members carried by said containers having sockets opening fore and aft, and jack screws mounted on said jacks and adjustable in a fore and aft direction to snugly enter said open sockets when said jacks are raised to lock the container against lateral displacement on the transport vehicle, said socket members and jack screws presenting co-operative flanges engageable in fore and aft thrust contact when said jack screws have been entered a predetermined distance into said sockets.

3. The combination with a transportation vehicle and a goods container movably mounted thereon, of paired jaw shaped brackets mounted on the fore and aft ends of said container and opening laterally toward opposite sides of the transportation vehicle, jacks pivotally mounted on the vehicle and having projecting lock portions to enter the open side of the jaws of said brackets from opposite sides when the jacks are swung into a vertical position from opposite directions to lock the container on the vehicle, and means for holding said jacks in the vertical position.

4. In a transportation vehicle having recesses in its deck, and rigid frames mounted in said recesses, the combination with a horizontal shaft mounted in each of said frames with its axis arranged lengthwise of the vehicle, and a jack pivotally mounted on each of said shafts and adapted to lie horizontally in said recesses and to be raised to a vertical position, of a jack screw adjustable horizontally in each of said jacks and having a projecting tapered end, a goods container mounted on castors and having a bracket mounted on each corner thereof formed with a tapered socket to receive the tapered end of said jack screws in locking engagement, the tapered formation of the sockets and jack screws ensuring guided entry of the jack screws into the sockets irrespective of slight variations encountered in the level or disposition of the sockets of different containers, and a flange partially encircling each socket and having an opening in the outward side to permit the locking end of the jack screw to swing into and out of axial alignment with the tapered socket, said flange co-operating with said jack screw as an auxiliary or safety locking means for the container.

5. In a transportation vehicle having a goods container movably mounted thereon and jack members pivotally mounted on said vehicle to swing laterally to clear said containers and to swing upwardly, the combination therewith of bracket members rigidly mounted on said containers each having a socket recess, a jaw-shaped guiding flange embracing the top, bottom and one side of said socket recess and forming an extension of the recess proper, jack screws threaded horizontally in said jacks to align with said socket recesses only when said jack members have been swung upwardly to a predetermined position, said jack screws having ends adapted to first enter the jaw shaped flanges from the open sides and be embraced thereby in interlocking relation, and to be thereafter threaded axially into firm locking contact with the said socket recesses, said jaw-shaped flanges being adapted to co-operate with said jack screws as an auxiliary or safety locking means for said containers independent of the locking engagement of said jack screws with said sockets, and means independent of the container for locking the jack members in said predetermined upwardly swung position.

6. Means as claimed in claim 2 in which the vehicle deck is adapted to accommodate two containers disposed with their inward ends adjacent, the sockets being mounted on the fore and aft ends of the containers and jacks mounted midway of the length and at each end of the vehicle, the midway jacks each being provided with studs projecting forwardly and rearwardly to enter and interlock with the adjacent socket members on the adjacent ends of the two containers.

7. Means as claimed in claim 2 in which said jack screws are provided with notches and a handle transversely pivoted on a collar rotatable on each jack screw which handle carries a lug projection engageable in the jack screw notches only when said handle is swung on its pivot to a position transversely of the jack screw to effect rotative adjustment and locking of the jack screw, said lug being disengageable from cooperative contact with the jack screw notches when swung into longitudinal relation to the jack shaft to permit disengagement of the lug from one notch and engagement with a different notch.

8. A transport vehicle having openings in the deck thereof and frames rigidly mounted in said openings below the deck, a shaft mounted horizontally in each of said frames, and a jack mounted on each of said shafts adapted to extend above the deck or to be in a horizontal position in the frame, a cover plate for said opening hinged at one side of the frame and movable to a position to cover said opening and to concurrently engage and hold the jack in a raised position, horizontal projections on said jacks, and a goods container movable upon said vehicle, and having socket members to engage said horizontal projections in locking contact.

WILLIAM P. KELLETT.